(12) United States Patent
Shibuya

(10) Patent No.: US 9,591,186 B2
(45) Date of Patent: Mar. 7, 2017

(54) IMAGE FORMING SYSTEM AND IMAGE FORMING METHOD WHICH GENERATE AND UTILIZE A TONE CORRECTION VALUE

(71) Applicant: Takeshi Shibuya, Kanagawa (JP)

(72) Inventor: Takeshi Shibuya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/918,769

(22) Filed: Oct. 21, 2015

(65) Prior Publication Data

US 2016/0132011 A1 May 12, 2016

(30) Foreign Application Priority Data

Nov. 6, 2014 (JP) ................. 2014-226441

(51) Int. Cl.
*H04N 1/60* (2006.01)
*H04N 1/00* (2006.01)
*G03G 15/00* (2006.01)

(52) U.S. Cl.
CPC ........... *H04N 1/6027* (2013.01); *G03G 15/50* (2013.01); *G03G 15/5062* (2013.01); *H04N 1/00005* (2013.01); *H04N 1/00015* (2013.01); *H04N 1/00023* (2013.01); *H04N 1/00031* (2013.01); *H04N 1/00034* (2013.01); *H04N 1/00068* (2013.01); *H04N 1/00082* (2013.01); *H04N 1/60* (2013.01); *H04N 1/603* (2013.01); *G03G 2215/0129* (2013.01); *G03G 2215/0164* (2013.01)

(58) Field of Classification Search
None
See application file for complete search history.

(56) References Cited

U.S. PATENT DOCUMENTS

| 5,508,826 A * | 4/1996 | Lloyd .................. H04N 1/6033 347/19 |
| 2007/0122022 A1* | 5/2007 | Shimizu .................. G06K 9/00 382/135 |

(Continued)

FOREIGN PATENT DOCUMENTS

| JP | 2004-112470 | 4/2004 |
| JP | 2007-171967 | 7/2007 |

(Continued)

*Primary Examiner* — Scott A Rogers
(74) *Attorney, Agent, or Firm* — Oblon, McClelland, Maier & Neustadt, L.L.P.

(57) ABSTRACT

An image forming system includes an image output device, a measurement sensor, a tone correction value generation unit, and a tone correction unit. The image output device outputs an image on a recording medium with a mixture of a plurality of basic colors based on an image data array combining the basic colors. The measurement sensor measures a reflection characteristic of at least a part of the image output by the image output device. The tone correction value generation unit generates, for each of the basic colors, a tone correction value for correcting a tone characteristic of the basic color by synthesizing a correction array forming a regular matrix based on the reflection characteristic measured by the measurement sensor and the image data array. The tone correction unit corrects an image output by the image output device with the tone correction value.

19 Claims, 6 Drawing Sheets

(56) References Cited

U.S. PATENT DOCUMENTS

| | | |
|---|---|---|
| 2011/0304863 A1 | 12/2011 | Shibuya |
| 2012/0206745 A1 | 8/2012 | Shibuya |
| 2013/0207996 A1 | 8/2013 | Shibuya |
| 2015/0116779 A1 | 4/2015 | Shibuya |

FOREIGN PATENT DOCUMENTS

| | | |
|---|---|---|
| JP | 2010-263345 | 11/2010 |
| JP | 2012-023711 | 2/2012 |
| JP | 2012-070360 | 4/2012 |
| JP | 2012-169866 | 9/2012 |
| JP | 2013-128233 | 6/2013 |
| JP | 2014-072823 | 4/2014 |

* cited by examiner

IMAGE FORMING SYSTEM AND IMAGE FORMING METHOD WHICH GENERATE AND UTILIZE A TONE CORRECTION VALUE

CROSS-REFERENCE TO RELATED APPLICATION

This patent application is based on and claims priority pursuant to 35 U.S.C. §119(a) to Japanese Patent Application No. 2014-226441 on Nov. 6, 2014, in the Japan Patent Office, the entire disclosure of which is hereby incorporated by reference herein.

BACKGROUND

Technical Field

This disclosure relates to an image forming system and an image forming method for forming an image on a recording medium.

Related Art

An image forming system that forms a color image on a recording medium with a copier or a printer, for example, is expected to execute image quality control in continuous mass output of images, such as control of output colors to be reproduced within a predetermined variation range, for example Such an image forming system may be configured to correct the color tone to reduce the difference between a measurement value and a reference value by using a measurement sensor that measures the color of an output image.

In typical tone correction based only on the measurement value of the color of the output image, the tone correction value is calculated based on the variation in each of basic colors as a basis for image formation. To improve the reproducibility based on the tone correction, or to obtain a high-definition image with an increased number of basic colors, therefore, the measurement sensor is required to have an increased number of measurement channels.

SUMMARY

In one embodiment of this disclosure, there is provided an improved image forming system that includes, for example, an image output device, a measurement sensor, a tone correction value generation unit, and a tone correction unit. The image output device outputs an image on a recording medium with a mixture of a plurality of basic colors based on an image data array combining the basic colors. The measurement sensor measures a reflection characteristic of at least a part of the image output by the image output device. The tone correction value generation unit generates, for each of the basic colors, a tone correction value for correcting a tone characteristic of the basic color by synthesizing a correction array forming a regular matrix based on the reflection characteristic measured by the measurement sensor and the image data array. The tone correction unit corrects an image output by the image output device with the tone correction value.

In one embodiment of this disclosure, there is provided an improved image forming method that includes, for example, outputting an image on a recording medium with a mixture of a plurality of basic colors based on an image data array combining the basic colors, measuring a reflection characteristic of at least a part of the output image, generating, for each of the basic colors, a tone correction value for correcting a tone characteristic of the basic color by synthesizing a correction array forming a regular matrix based on the measured reflection characteristic and the image data array, and correcting an image to be output with the tone correction value.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
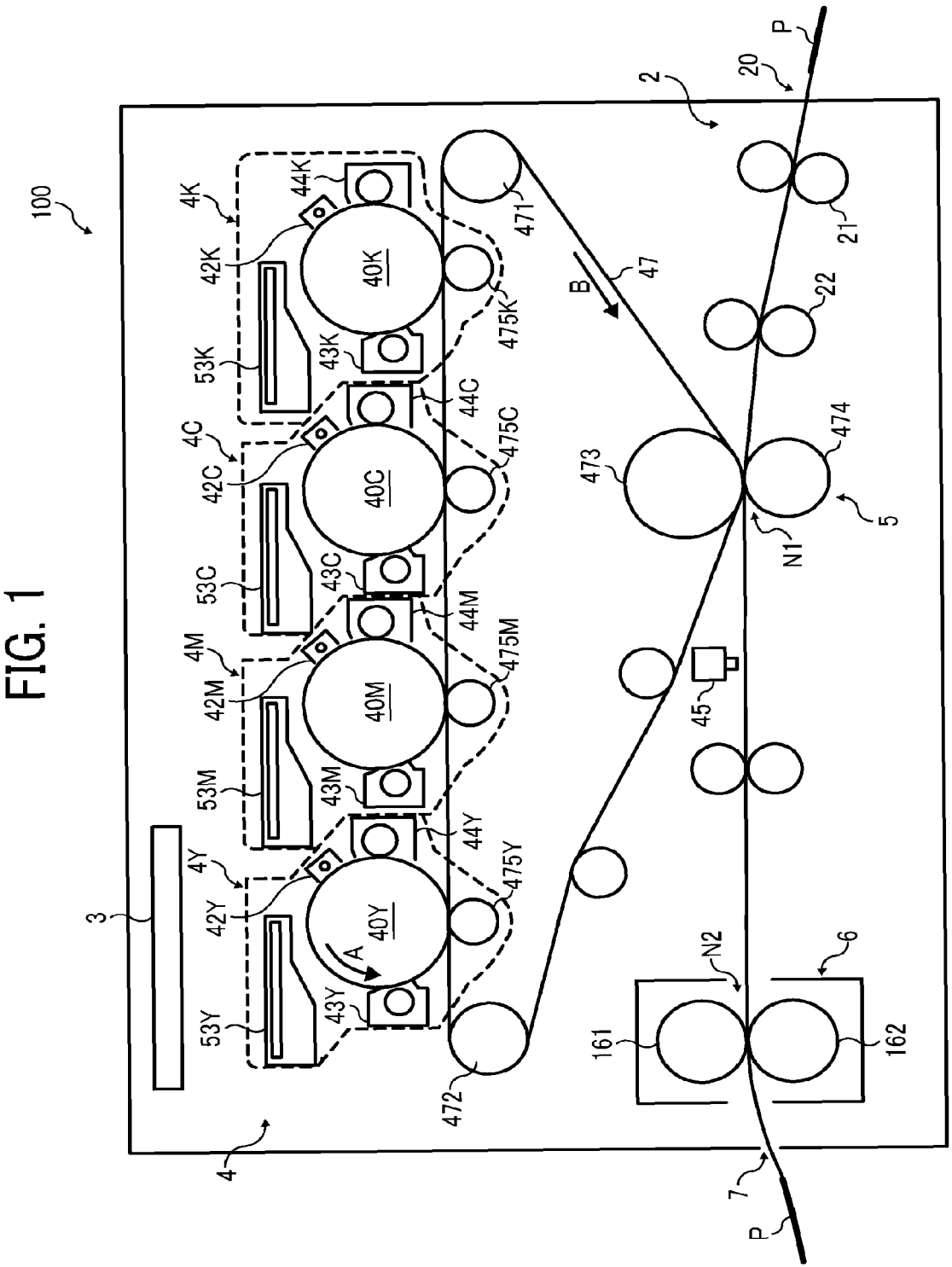
FIG. 1 is a schematic diagram illustrating a configuration example of an image forming apparatus in an image forming system according to an embodiment of this disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same function, operate in a similar manner, and achieve a similar result.

Referring now to the drawings, wherein like reference numerals designate identical or corresponding parts throughout the several views, an embodiment of this disclosure will be described.

FIG. 1 schematically illustrates an overall configuration of an image forming apparatus in an exemplary image forming system according to the present embodiment.

In the present embodiment, an image forming apparatus 100 includes a sheet feeding unit 2, a controller 3, an image forming unit 4, a registration roller pair 22, a transfer unit 5, a fixing unit 6, a sheet ejection unit 7, and a measurement sensor 45.

The sheet feeding unit 2 transports a sheet P serving as a recording medium. The sheet feeding unit 2 includes a sheet feeding port 20 and a plurality of sheet feeding rollers 21 for transporting the sheet P fed through the sheet feeding port 20 to the transfer unit 5. The controller 3 forms image information based on input document data. The image forming unit 4, which forms an image output device, is an electrophotographic printer engine that forms a toner image based on the image information and primary-transfers the toner image onto a transfer belt 47.

The registration roller pair 22 receives the sheet P supplied by the sheet feeding unit 2, and feeds the sheet P to the transfer unit 5 with predetermined timing.

The transfer unit 5 serves as a secondary transfer device that transfers the toner image carried on the transfer belt 47 onto the sheet P at a secondary transfer position N1, at which a nip area facing the transfer belt 47 is formed. The fixing unit 6 including a heating roller 161 and a fixing roller 162 fixes the toner image on the sheet P at a fixing nip area N2. The sheet ejection unit 7 ejects the sheet P to the outside of the image forming apparatus 100.

The measurement sensor 45 measures reflection characteristics of the image. For example, the measurement sensor 45 is located downstream of the secondary transfer position N1 in a transport direction of the sheet P to measure the reflection characteristics of all or a part of the image formed on the sheet P.

The image forming unit 4 includes four process units 4Y, 4M, 4C, and 4K corresponding to basic colors yellow (Y), magenta (M), cyan (C), and black (K), respectively.

Since the process units 4Y, 4M, 4C, and 4K are similar in configuration, the following description will be limited to the process unit 4Y corresponding to yellow (Y) to avoid redundant description.

The process unit 4Y includes a drum-shaped photoconductor 40Y, a laser unit 53Y, a charging device 42Y, a developing device 43Y, a primary transfer roller 475Y, and a cleaning device 44Y.

The photoconductor 40Y serving as an image bearer is a rotary member that rotates in counterclockwise direction A illustrated in FIG. 1. The laser unit 53Y serves as an optical writing device and an optical scanning device. The laser unit 53Y emits scanning light onto a photosensitive layer on an outer circumferential surface of the photoconductor 40Y to scan the surface of the photoconductor 40Y.

The photoconductor 40Y is surrounded by the developing device 43Y, the charging device 42Y provided upstream in direction A of the developing device 43Y, the primary transfer roller 475Y serving as a primary transfer device and having the transfer belt 47 passing thereover, and the cleaning device 44Y provided downstream in direction A of a position at which the primary transfer roller 475Y faces the photoconductor 40Y.

The process unit 4Y further includes a surface potential sensor serving as a surface potential detector that detects the surface potential of the photoconductor 40Y.

In the process unit 4Y, the laser unit 53Y forms a latent image on the photoconductor 40Y, and the developing device 43Y develops the latent image into a toner image of yellow, i.e., one of the basic colors.

The other process units 4M, 4C, and 4K include photoconductors 40M, 40C, and 40K, laser units 53M, 53C, and 53K, charging devices 42M, 42C, and 42K, developing devices 43M, 43C, and 43K, primary transfer rollers 475M, 475C, and 475K, cleaning devices 44M, 44C, and 44K, and surface potential sensors, respectively, and form toner images of the other basic colors magenta, cyan, and black.

With the above-configured process units 4Y, 4M, 4C, and 4K, the image forming unit 4 forms the image output device that outputs a toner image onto the sheet P with a mixture of the basic colors based on the image information, which is an image data array combining the basic colors. That is, the image output device outputs a mixed-color image based on an image data array of a plurality of colors.

The transfer unit 5 includes the transfer belt 47, a drive roller 471, a driven roller 472, a secondary transfer roller 473, and a secondary transfer opposite roller 474.

The drive roller 471 is driven to rotate in direction B in FIG. 1 by a drive source. The driven roller 472 and the secondary transfer roller 473 rotate in direction B similarly to the drive roller 471. The secondary transfer opposite roller 474 is disposed facing the secondary transfer roller 473.

At the secondary transfer position N1 in the transfer unit 5, the secondary transfer opposite roller 474 contacts the transfer belt 47 to form the nip area, as described above. The transfer unit 5 transfers (i.e., secondary-transfers) the toner image on a surface of the transfer belt 47 onto the sheet P by holding the transfer belt 47 and the sheet P between the secondary transfer opposite roller 474 and the secondary transfer roller 473 at the secondary transfer position N1 and applying therebetween a secondary transfer bias having a charge opposite to a static charge on the surface of the transfer belt 47. The secondary transfer opposite roller 474 then transports the sheet P subjected to the secondary transfer at the secondary transfer position N1 to the fixing unit 6.

The transfer belt 47 is made of a polyimide resin having low elasticity and dispersed with carbon powder for adjusting the electrical resistance of the transfer belt 47. The transfer belt 47 is wound around the drive roller 471, the driven roller 472, the secondary transfer roller 473, and the primary transfer rollers 475Y, 475M, 475C, and 475K.

The measurement sensor 45 is an in-line chromaticity measurement device combining a plurality of monochrome line sensors preceded by band-pass filters corresponding to three measurement target colors red, green, and blue to be sensitive to the measurement target colors. That is, the measurement sensor 45 in the present embodiment has measurement channels with three predetermined spectral characteristics corresponding to the three colors red (R), green (G), and blue (B). The number of measurement channels included in the measurement sensor 45 is herein referred to as the measurement channel number.

The measurement sensor 45 may be a sensor having a measurement channel with at least one predetermined spectral characteristic, i.e., a measurement channel sensitive to one or more basic colors, and may be a so-called color scanner. Alternatively, the measurement sensor 45 may be a monochrome line sensor having a single predetermined spectral characteristic, as described later.

The controller 3 operates as a communication control device for controlling bidirectional communication between the image forming apparatus 100 and a host apparatus (e.g., a personal computer) via a communication network or the like. The controller 3 further operates as an image data processing device that transmits to the image forming unit 4 the image data created based on the document data transmitted from the host apparatus.

Figure 2:
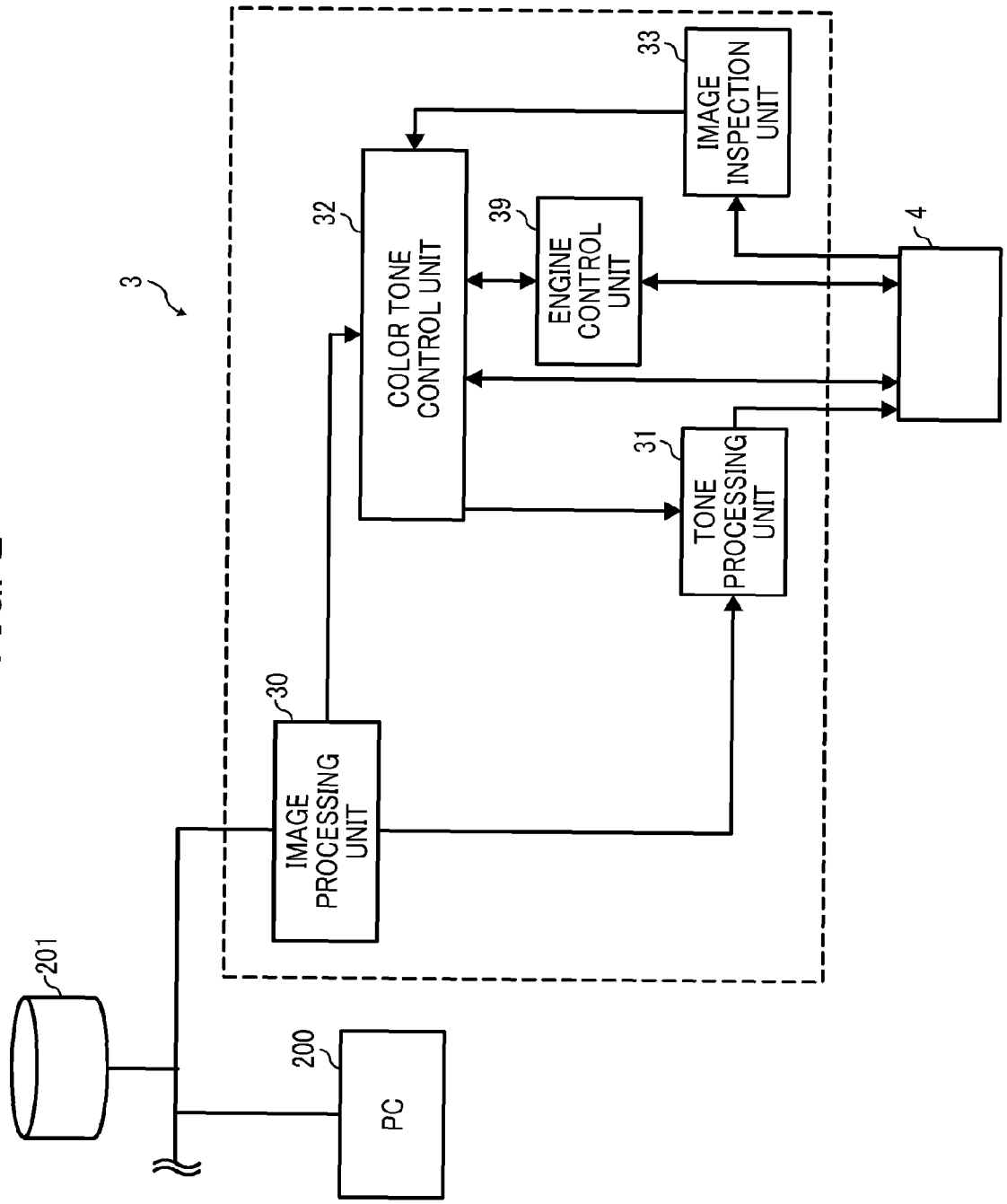
FIG. 2 is a schematic block diagram illustrating a configuration example of a controller of the image forming apparatus illustrated in FIG. 1.

As illustrated in FIG. 2, the controller 3 includes an image processing unit 30, a tone processing unit 31, an image inspection unit 33, a color tone control unit 32, and an engine control unit 39.

The image processing unit 30 receives the document data transmitted from the host apparatus that stores the document data, such as a personal computer (PC) 200 or a server 201, and processes the document data into image information. The tone processing unit 31 converts the image information into image data in a format compatible with the image forming unit 4.

The image inspection unit 33 performs in-line inspection of the image output by the image forming unit 4 to obtain image information from the image. The color tone control unit 32 detects a variation in the color tone of the image from the obtained image information and provides a tone correction value to the tone processing unit 31. The engine control unit 39 controls the image forming unit 4.

The engine control unit 39, the color tone control unit 32, the tone processing unit 31, and the image inspection unit 33 of the controller 3 are included in the image forming apparatus 100 and implemented by a control board such as an application specific integrated circuit (ASIC) or a control processor such as a central processing unit (CPU) provided in the image forming apparatus 100.

The image processing unit 30 is implemented by, for example, an expansion board detachable from the image forming apparatus 100 and capable of operating in cooperation with software running on a personal computer provided separately from the image forming apparatus 100. Further, the expansion board is replaceable and thus functions as a system independent of the image forming apparatus 100.

The image processing unit 30 may be provided to a terminal provided separately from the image forming apparatus 100, or may be provided to the server 201 or the PC 200 via a network. Further, the image processing unit 30 may be provided to the image forming apparatus 100. In any case, the image processing unit 30 is included in an image forming system 1000 that performs the image formation, as illustrated in FIG. 3.

Figure 3:
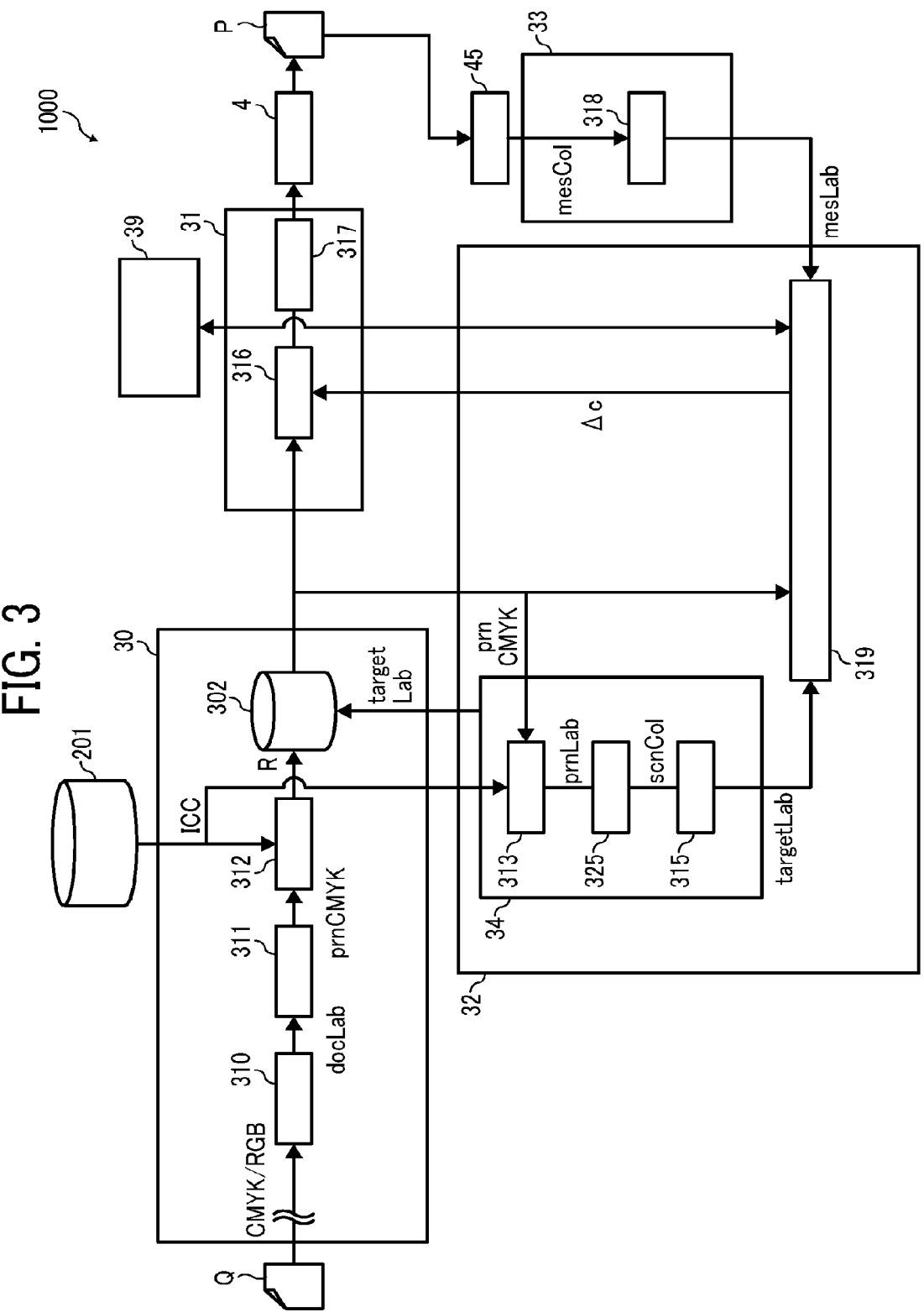
FIG. 3 is a schematic block diagram illustrating a configuration example of the image forming system including the image forming apparatus illustrated in FIG. 1.

As illustrated in FIG. 3, the image processing unit 30 includes a document color-Lab conversion unit 310, a Lab-CMYK conversion unit 311, a user tone conversion unit 312, and a memory 302. The document color-Lab conversion unit 310 converts document data Q into the Lab format. The Lab-CMYK conversion unit 311 converts the data in the Lab format into the CMYK format. The user tone conversion unit 312 corrects the tone based on a selected color profile. The memory 302 is a hard disk drive for temporarily storing calculated values of image data R or continuously storing the values during the image formation.

The tone processing unit 31 includes a tone correction unit 316 and a tone conversion unit 317. The tone correction unit 316 serves as a tone correction unit that corrects the image to be output by the image forming unit 4 by using a tone correction value $\Delta c=(\Delta c(c), \Delta m(m), \Delta y(y), \Delta k(k))$ for correcting tone characteristics of each of the basic colors. That is, the tone correction unit 316 corrects the tone characteristics of the colors based on the tone correction value $\Delta c$. The tone conversion unit 317 converts received data into a format representable by the image forming unit 4.

Herein, $\Delta c(c)$ represents the correction amount for an input tone value c for cyan, and will hereinafter be simply described as $\Delta c$ where the indication of the input tone value c is unnecessary. The same applies to $\Delta m(m)$, $\Delta y(y)$, and $\Delta k(k)$.

The image inspection unit 33 includes a scanner color-Lab conversion unit 318 that converts the image measured by the measurement sensor 45 into Lab values, i.e., obtains measurement values of the image.

The color tone control unit 32 includes a colorimetric prediction unit 34 and a color tone correction amount determination unit 319. The colorimetric prediction unit 34 predicts and outputs the tone of the image to be formed based on the image information input from the image processing unit 30. The color tone correction amount determination unit 319 serves as a tone correction value generation unit that generates the tone correction value $\Delta c$.

The colorimetric prediction unit 34 includes a CMYK-Lab conversion unit 313, a scanner correction unit 325, and a scanner color-Lab conversion unit 315. The CMYK-Lab conversion unit 313 converts the data in the CMYK format into the Lab format. The scanner correction unit 325 corrects input values based on previously provided reading errors of the measurement sensor 45.

The scanner color-Lab conversion unit 315 has similar functions to those of the foregoing scanner-color Lab conversion unit 318, and thus description thereof will be omitted.

The color tone correction amount determination unit 319 generates the tone correction value $\Delta c$ for each of the colors by synthesizing a correction array based on the reflection characteristics and the image data array.

In the image formation using the thus-configured image forming apparatus 100, the document data Q and a print request are first transmitted from the PC 200 or the server 201 on the network, as illustrated in FIG. 3.

The document data Q is in a complicated data format including a bitmap with colors designated as RGB or CMYK, text, and graphic rendering commands.

The image processing unit 30 processes the received document data Q into a pixel array of the basic colors cyan (C), magenta (M), yellow (Y), and black (K) (hereinafter simply referred to as CMYK) included in the image forming unit 4, such as bitmap data having the color information of respective pixels arranged in a grid pattern, for example, and transmits the pixel array to the tone processing unit 31.

The tone processing unit 31 converts the pixels into the number of tones representable by the image forming unit 4, and transmits the resultant data to the image forming unit 4 as the image data R, which is an image data array.

The image forming unit 4 outputs a toner image on the transfer belt 47 with a mixture of the colors CMYK based on the image data R received from the tone processing unit 31, and the transfer unit 5 transfers the toner image on the transfer belt 47 onto the sheet P at the secondary transfer position N1.

The image inspection unit 33 scans the image on the sheet P based on the reflection characteristics of the toner image detected by the measurement sensor 45. The color tone control unit 32 performs a later-described tone correction operation to correct the color tone correction amount to be provided to the engine control unit 39 and the tone processing unit 31 to minimize the deviation of the color of the output image from the color intended to be reproduced. Accordingly, the color of the image output to the sheet P is maintained constant.

After toner images of all colors are transferred to and carried by a surface of the sheet P, the sheet P enters the fixing unit 6 in FIG. 1. When the sheet P passes through the fixing nip area N2 between the heating roller 161 and the fixing roller 162, the toner images carried on the sheet P are fixed thereon with heat and pressure. Thereby, a desirable color image is formed on the sheet P.

The sheet P having the color toner image fixed thereon is discharged from the fixing unit 6 and ejected to the outside of the image forming apparatus 100 through the sheet ejection unit 7. The sheet ejection unit 7 may include a switching pawl and a duplex unit to guide the sheet P to the duplex unit with the switching pawl to form images on both surfaces of the sheet P.

The tone correction process will now be described in more detail.

In the following example, the color tone control unit 32 adopts the Lab (Commission Internationale de l'Eclairage (CIE) Lab; CIELab) format to convert the CMYK-format color data of the document data Q into the Lab format. However, the format is not limited to the Lab format, and the color tone control unit 32 may adopt any other color representation format.

Further, each of the document color-Lab conversion unit 310, the Lab-CMYK conversion unit 311, the CMYK-Lab conversion unit 313, and the scanner color-Lab conversion units 315 and 318 uses basic data called "color profile" for color space conversion. The color profile for converting the color of the document into Lab values is attached to the document data Q or prepared beforehand, and the color profile for the scanner color-Lab conversion units 315 and 318 is preset in the color tone control unit 32 and the image inspection unit 33.

As to the color profile for the Lab-CMYK conversion unit 311 and the CMYK-Lab conversion unit 313, it is desirable to select a color profile suitable for the type of the sheet P from a plurality of color profiles previously stored in the server 201, since the sheet type affects color reproducibility.

Such a change of the color profile according to the type of the sheet P may be performed by a user as desired, or may be automatically performed by the image processing unit 30 in accordance with the selection of the sheet P suitable for the input document data Q.

Further, the above-described color profile may be the International Color Consortium (ICC) profile specified by the ICC, for example.

Figure 4:
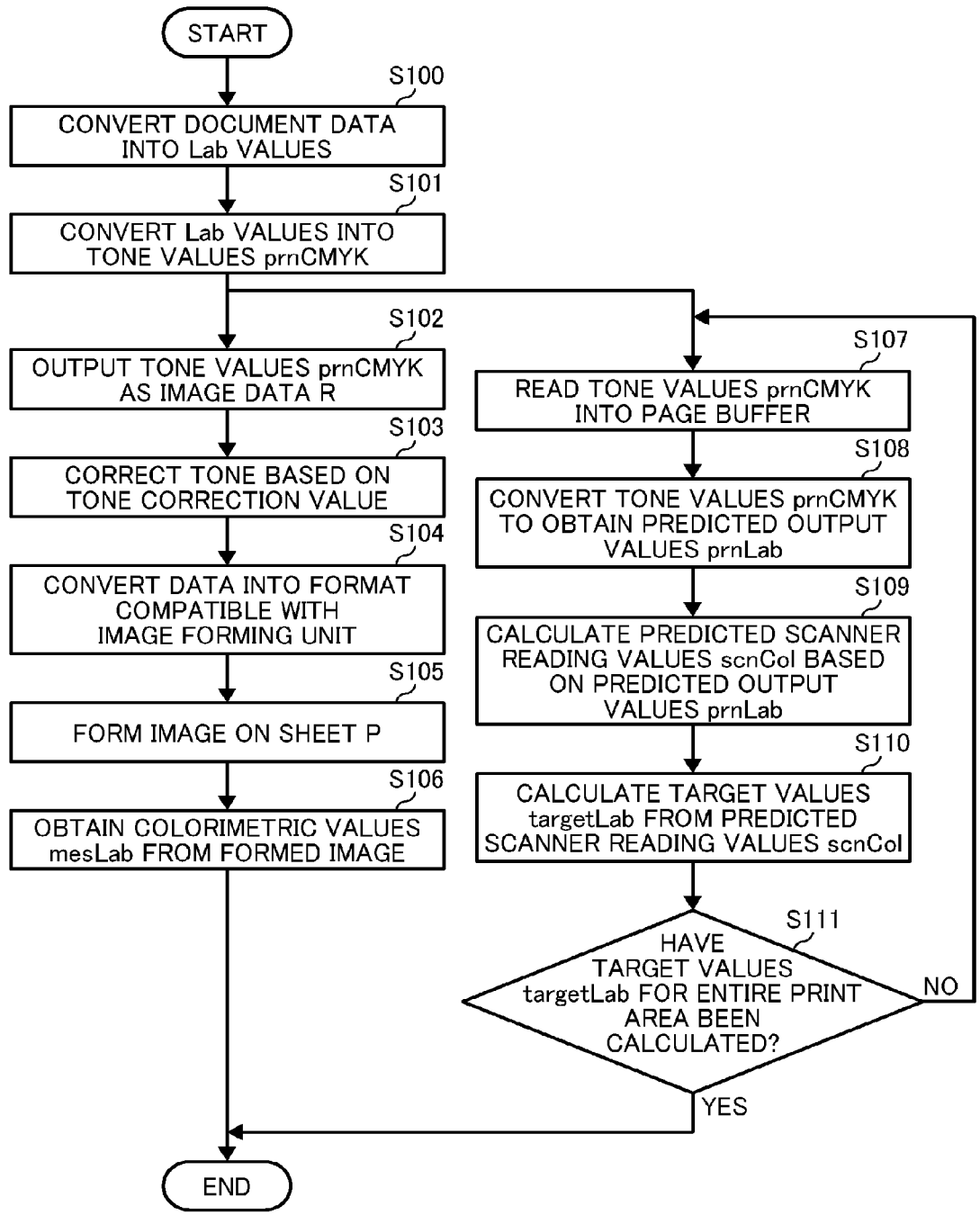
FIG. 4 is a flowchart illustrating an operation example of the image forming system illustrated in FIG. 3.

As illustrated in FIG. 4, the document color-Lab conversion unit 310 converts the document data Q transmitted to the image processing unit 30, i.e., the color data represented in the RGB format or the CMYK format, into docLab values, which are color specification values in the Lab format independent of devices (step S100).

The Lab-CMYK conversion unit 311 converts the docLab values into tone values prnCMYK, which are a set of 8-bit integer tone values, for the respective basic colors CMYK used in the image forming unit 4 (step S101).

In the initial state, the user tone conversion unit 312 directly outputs the tone values prnCMYK as the image data R without changing the tone values prnCMYK (step S102).

The above steps take place at the same time as the deployment of vector data and fonts. The resultant image data R is output as bitmap data for the four basic colors CMYK, in which the color information of the document data Q is quantized. The output image data R is stored in the memory 302 of the image processing unit 30 for each document used for printing.

The tone correction unit 316 corrects the tone characteristics of each of the colors based on the tone correction value $\Delta c$. For example, the tone correction unit 316 includes a tone correction (tone response correction; TRC) table for each of the basic colors CMYK, and corrects the tone of the basic color by using the tone correction value $\Delta c$ and the tone correction table (step S103).

The tone conversion unit 317 receives color values transmitted in 8 bits for the respective basic colors, and converts the color values with the area coverage modulation method or the error diffusion method in accordance with the number of tones representable by the image forming unit 4 (step S104).

The image forming unit 4 receives the image data R thus converted by the tone processing unit 31 into the format representable by the image forming unit 4, and forms a toner image (step S105).

The toner image formed by the image forming unit 4 is transferred onto the sheet P by the transfer unit 5 and scanned based on the reflection characteristics of the toner image measured by the measurement sensor 45.

The image inspection unit 33 inputs the image information of the scanned toner image to the scanner color-Lab conversion unit 318 as output measurement values mesCol.

The scanner color-Lab conversion unit 318 converts the output measurement values mesCol into Lab values to obtain colorimetric values mesLab (step S106).

The color tone correction amount determination unit 319 previously reads the tone values prnCMYK of a target area from the bitmap data accumulated in the memory 302 into a page buffer (step S107).

In the color tone control unit 32, the CMYK-Lab conversion unit 313 converts the image data from the CMYK format into the Lab format, and stores the converted data as predicted output values prnLab (step S108). The predicted output values prnLab obtained by the color tone control unit 32 are Lab values resulting from simulation of the colors to be reproduced from the output image data R.

The predicted output values prnLab do not include reading errors specific to the measurement sensor 45. If the predicted output values prnLab are directly used for the correction, therefore, the correction is affected by the reading errors of the measurement sensor 45. For example, if the color gamut covered by the measurement sensor 45 is exceeded by the color gamut of the colors output by the image forming unit 4, the color gamut is compressed by the measurement sensor 45, raising the possibility that the predicted output values prnLab substantially differ from the output measurement values mesCol obtained from the scanning using the measurement sensor 45.

The scanner correction unit 325 corrects the predicted output values prnLab based on the previously provided reading errors of the measurement sensor 45, to thereby calculate predicted scanner reading values scnCol (step S109).

With the above-configured scanner correction unit 325, the reading values of the colors are accurately predicted even if the color gamut covered by the measurement sensor 45 is exceeded by the color gamut of the colors output by the image forming unit 4.

The scanner color-Lab conversion unit 315 converts the predicted scanner reading values scnCol input thereto by the scanner correction unit 325 into Lab values, to thereby calculate target values targetLab (step S110).

The colorimetric prediction unit 34 previously stores in the memory 302 the target values targetLab calculated as described above for the entire print area to be printed (step S111).

The color tone correction amount determination unit 319 determines the tone correction value $\Delta c = (\Delta c, \Delta m, \Delta y, \Delta k)$ for correcting the tone correction table based on the target values targetLab, the colorimetric values mesLab, and the tone values prnCMYK for the print area.

A description will now be given of a method for the color tone correction amount determination unit 319 to determine the tone correction value Δc.

Prior to the process of determining the tone correction value Δc, a plurality of micro colorimetric areas (xi, yi) (i=1, ..., N), each having an approximate size of a few millimeters square and little change in color suitable for colorimetry, are first extracted from the print area in each page. Herein, each micro colorimetric area (xi, yi) is represented by coordinates (x, y) of the center thereof. As a method of extracting the micro colorimetric area (xi, yi), a 400 dpi area formed of 41×41 pixels may be selected and extracted from a given area having an approximate size of 5 millimeters square, for example. If the number of samples is insufficient with the micro colorimetric areas (xi, yi) extracted from a single page, the N number of micro colorimetric areas (xi, yi) are extracted from a few successive pages to determine the tone correction value Δc. A process of generating the tone correction value Δc illustrated in FIG. 5 is repeated for each cycle of this extraction of micro colorimetric areas (xi, yi).

Figure 5:
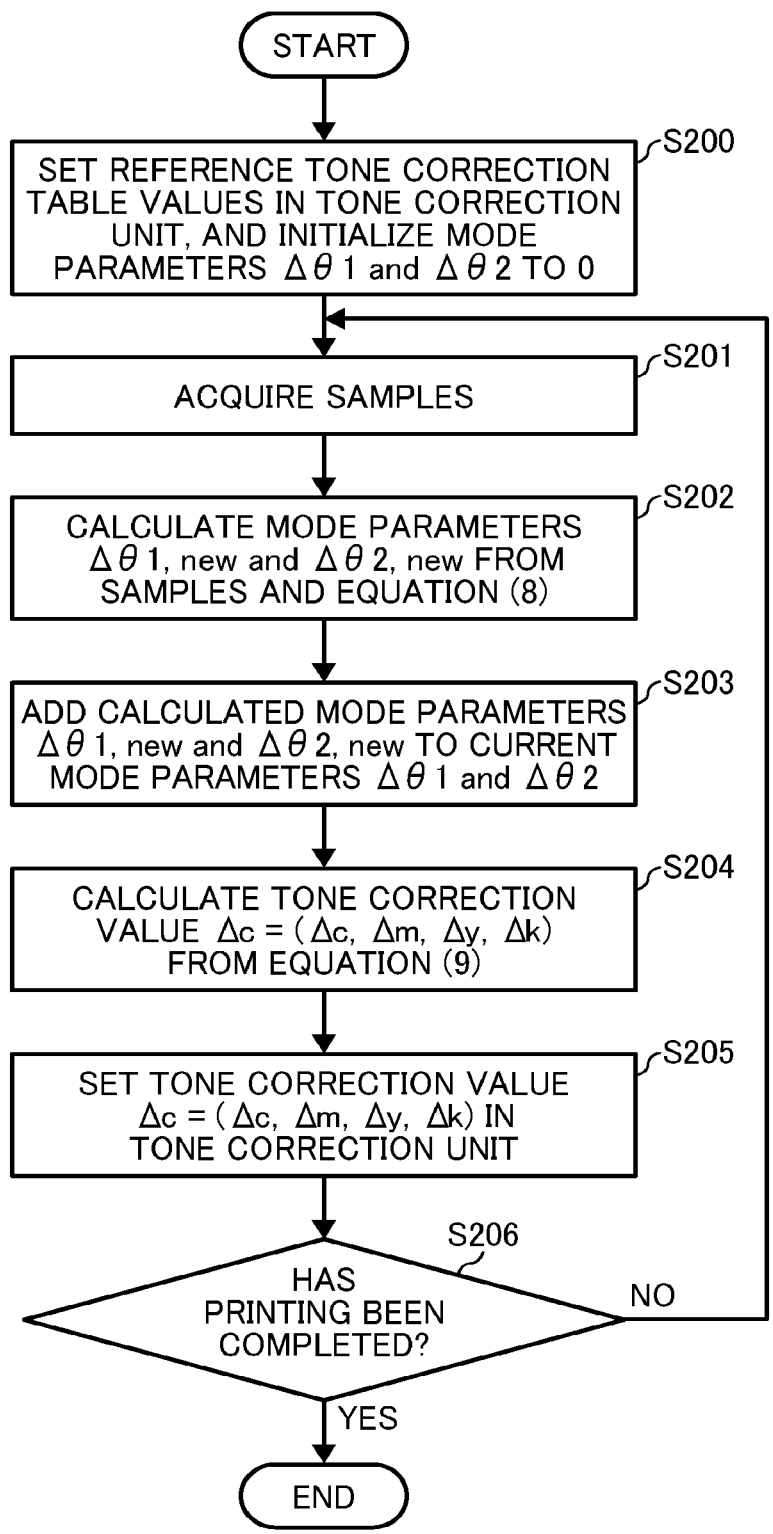
FIG. 5 is a flowchart illustrating an operation example of a tone correction value generation unit of the image forming system illustrated in FIG. 3.

With reference to FIG. 5, a description will be given of an algorithm for calculating the tone correction value Δc based on the average value of the measurement values in the N number of micro colorimetric areas (xi, yi) (i=1, ..., N). In the following description, sample serial numbers and coordinates of individual micro colorimetric areas are not essential, and thus will be omitted.

In the process illustrated in FIG. 5, reference tone correction table values, i.e., initial TRC table values for the respective colors CMYK, are first set to $c_0(c)$, $m_0(m)$, $y_0(y)$, and $k_0(k)$, and a mode parameter $\Delta\theta_i^j$ (i={1, 2}, j={c, m, y, k}) are initialized to 0 (step S200). Herein, the superscript j (i.e., c, m, y, or k) is not an exponent but simply a suffix for identification, and will be omitted where the indication thereof is unnecessary.

For simplicity of description, it is assumed in the present example that the TRC table for each of the colors is implemented as a look-up table (LUT), which is an integer array with an element number of 256. The above-described reference tone correction table value $c_0(c)$, for example, is therefore implemented as an integer array of 256 elements each having an integer value c ranging from 0 to 255, and 0 in the reference tone correction table value $c_0(c)$ indicates a 256-array with zero elements. The same applies to the other reference tone correction table values $m_0(m)$, $y_0(y)$, and $k_0(k)$ and variation modes described below. This is of course an example of implementation, and thus the TRC table may be implemented as a LUT having a larger element number or as a LUT having a smaller element number and an interpolation algorithm or a function model with control parameters therefor. Further, the range of numerical values may be other than the integer values 1 to 255, such as integers 0 to 100 or real values between 0 and 1.

Then, the colorimetric value mesLab and the target value targetLab are extracted for the foregoing N number of micro colorimetric areas (step S201). Herein, the correction value minimizing the variation of the colorimetric value mesLab from the target value targetLab is the tone correction value Δc=(Δc(c), Δm(m), Δy(y), Δk(k)).

A case is assumed in which, to obtain the tone correction value Δc, perturbative calculation is performed with the corrected CMYK tone values corrected by the tone correction unit 316 in accordance with a variation mode number that previously specifies the respective elements. The variation mode of the perturbation is herein defined as change mode data.

In this case, the corrected CMYK tone values are expressed by equation (1).

$$\begin{cases} \tilde{c} = c_0(c) + \theta_1^c c_1(c) + \theta_2^c c_2(c) \\ \tilde{m} = m_0(m) + \theta_1^m m_1(m) + \theta_2^m m_2(m) \\ \tilde{y} = y_0(y) + \theta_1^y y_1(y) + \theta_2^y y_2(y) \\ \tilde{k} = k_0(k) + \theta_1^k k_1(k) + \theta_2^k k_2(k) \end{cases} \quad (1)$$

Herein, c, m, y, and k represent the CMYK tone values before being corrected, $c_0$, $m_0$, $y_0$, and $k_0$ represent the foregoing reference tone correction table values, $c_1$, $m_1$, $y_1$, and $k_1$ represent a first variation mode, $c_2$, $m_2$, $y_2$, and $k_2$ represent a second variation mode, and 0, (i={1, 2}) represents the mode parameter. The mode parameter $\theta_i$ is a real scalar that provides the degree of influence of each of the variation modes determined by a later-described method. The variation modes are 256-arrays (i.e., a 256-dimensional vectors) linearly independent of each color for each of the colors (i.e., there is linear independence between $c_1$ and $c_2$, $m_1$ and $m_2$, $y_1$ and $y_2$, and $k_1$ and $k_2$). The mode parameter $\theta_i$ determines the degree of contribution of each of the variation modes.

Although the variation mode number (i.e., the number of variation modes) may be three or more, two variation modes linearly independent from each other, i.e., the first and second variation modes, will be described here as an example, for simplicity of description.

When the variation of the CMYK tone values is represented as a vector dc and i=1, 2, the relationship of equation (1) is expressed by equation (2).

$$d\tilde{c} = M_1(c)d\theta_1 + M_2(c)d\theta_2 \quad (2)$$

The elements of equation (2) are provided by equation (3) given below.

$$\tilde{c} = (\tilde{c}, \tilde{m}, \tilde{y}, \tilde{k}), \quad (3)$$

$$d\tilde{c} = (d\tilde{c}, d\tilde{m}, d\tilde{y}, d\tilde{k}),$$

$$d\theta_i = {}^t(\theta_i^c, \theta_i^m, \theta_i^y, \theta_i^k),$$

$$M_i(c) = \begin{bmatrix} c_i(c) & 0 & 0 & 0 \\ 0 & m_i(m) & 0 & 0 \\ 0 & 0 & y_i(y) & 0 \\ 0 & 0 & 0 & k_i(k) \end{bmatrix}$$

$M_1$ and $M_2$ will hereinafter be referred to as the first variation mode matrix and the second variation mode matrix, respectively.

An evaluation function φ for evaluating the colorimetric value mesLab is expressed by equation (4).

$$\phi(\Delta\theta_1, \Delta\theta_2) = E[\|f(\text{Lab}_m, \text{Lab}_t) - J(M_1\Delta\theta_1 + M_2\Delta\theta_2)\|^2] \quad (4)$$

Herein, the variation of print characteristics is approximated with the mode parameters $\Delta\theta_1$ and $\Delta\theta_2$ that minimize the evaluation function φ.

In equation (4), the colorimetric value mesLab and the target value targetLab are represented as $\text{Lab}_m$ and $\text{Lab}_t$, respectively. Further, a color difference evaluation function $f=(f_1, f_2, \ldots, f_n)$ is an appropriate differentiable function for mapping from the Lab space to the n-dimensional number space. Further, E represents an expected value (i.e., sample average), and J represents a Jacobian matrix (equation (5)) of a composite function $f_i(Lab_m(c, m, y, k), Lab_t(c, m, y, k))$ of these elements.

$$J = \left(\frac{\partial f}{\partial c}\right) = \begin{pmatrix} \frac{\partial f1}{\partial c} & \frac{\partial f1}{\partial m} & \frac{\partial f1}{\partial y} & \frac{\partial f1}{\partial k} \\ \frac{\partial f2}{\partial c} & \frac{\partial f2}{\partial m} & \frac{\partial f2}{\partial y} & \frac{\partial f2}{\partial k} \\ \vdots & \vdots & \vdots & \vdots \\ \frac{\partial fn}{\partial c} & \frac{\partial fn}{\partial m} & \frac{\partial fn}{\partial y} & \frac{\partial fn}{\partial k} \end{pmatrix} \quad (5)$$

A correction array F expressed by equation (6) will now be discussed.

$$F = \begin{bmatrix} E[{}^tM_1 {}^tJJM_1] & E[{}^tM_1 {}^tJJM_2] \\ E[{}^tM_2 {}^tJJM_1] & E[{}^tM_2 {}^tJJM_2] \end{bmatrix} \quad (6)$$

As obvious from equation (6), the correction array F is a matrix formed based on the first variation mode matrix M1 and the second variation mode matrix M2. That is, each of the elements in the correction array F includes the first variation mode ($c_1$, $m_1$, $y_1$, $k_1$) and/or the second variation mode ($c_2$, $m_2$, $y_2$, $k_2$).

Herein, the correction array F is a square matrix having the variation mode number of elements each including 4 columns and 4 rows, in which the product of the first variation mode matrix M1 and the Jacobian matrix is multiplied by the transpose of the first variation mode matrix M1 and the transpose of the Jacobian matrix, the product of the first variation mode matrix M1 and the Jacobian matrix is multiplied by the transpose of the second variation mode matrix M2 and the transpose of the Jacobian matrix, the product of the second variation mode matrix M2 and the Jacobian matrix is multiplied by the transpose of the first variation mode matrix M1 and the transpose of the Jacobian matrix, and the product of the second variation mode matrix M2 and the Jacobian matrix is multiplied by the transpose of the second variation mode matrix M2 and the transpose of the Jacobian matrix.

A necessary and sufficient condition for the correction array F to be regular, i.e., to have an inverse matrix is provided by equation (7).

$$\det(E[{}^tM_1{}^tJJM_1]E[{}^tM_2{}^tJJM_2]-E[{}^tM_1{}^tJJM_2]E[{}^tM_2{}^tJJM_1]) \neq 0 \quad (7)$$

If the samples only include three colors MYK, for example, one of the elements of the correction array F includes 0. Consequently, the rank is reduced, and the correction array F may fail to be regular.

In that case, equations (1) and (2) are redefined on the assumption that the colors used in the samples are the three colors MYK. Thereby, the correction array F is converted into a square matrix having the variation mode number of elements each including 3 columns and 3 rows, and thus satisfies the regularity condition even if the number of colors is reduced, as long as sufficient samples are available.

Mode parameters $\Delta\theta_{1,\ new}$ and $\Delta\theta_{2,\ new}$ that minimize equation (4) are calculated from equation (8) with the correction array F expressed by equations (6) and (7) (step S202). $F^{-1}$ in equation (8) represents an inverse matrix of the correction array F.

$$\begin{bmatrix} \Delta\theta_{1,new} \\ \Delta\theta_{2,new} \end{bmatrix} = F^{-1} \begin{bmatrix} E[{}^tM_1 {}^tJd] \\ E[{}^tM_2 {}^tJd] \end{bmatrix} \quad (8)$$

The color tone correction amount determination unit 319 adds the thus-obtained mode parameters $\Delta\theta_{1,\ new}$ and $\Delta\theta_{2,\ new}$ to the mode parameters $\Delta\theta_1$ and $\Delta\theta_2$ held in the color tone correction amount determination unit 319, to thereby update the mode parameters $\Delta\theta_1$ and $\Delta\theta_2$ (step S203). That is, the color tone correction amount determination unit 319 adds the mode parameters $\Delta\theta_{1,\ new}$ and $\Delta\theta_{2,\ new}$ obtained at step S202 to the current mode parameters $\Delta\theta_1$ and $\Delta\theta_2$, to thereby obtain the new mode parameters $\Delta\theta_1$ and $\Delta\theta_2$. The color tone correction amount determination unit 319 approximately calculates the tone correction value $\Delta c$= ($\Delta c$, $\Delta m$, $\Delta y$, $\Delta k$) to be added to the reference tone correction table values ($c_0$, $m_0$, $y_0$, $k_0$) from equation (9) given below (step S204).

That is, the color tone correction amount determination unit 319 holds the mode parameters $\Delta\theta_1$ and $\Delta\theta_2$ that determine the respective degrees of contribution of the change mode data items, and updates the mode parameters $\Delta\theta_1$ and $\Delta\theta_2$ based on the correction array F.

With the mode parameters $\Delta\theta_1$ and $\Delta\theta_2$ thus held and updated in the feedback loop for maintaining the colors constant (steps S201 to S205), quantization errors and errors due to truncation are prevented from accumulating and affecting the tone correction value $\Delta c$ for the quantized tone value.

The accumulation of quantization errors may also be prevented by holding the tone correction value $\Delta c$ as a set of vectors of real variables. However, the use of mode parameters is more desirable, preventing the error accumulation with a much smaller number of parameters and simplifying detailed processes such as outlier treatment.

$$\begin{cases} \Delta c \approx -\left(\frac{\partial c_0}{\partial c}\right)^{-1}(c_1(c)\Delta\theta_1^c + c_2(c)\Delta\theta_2^c) \\ \Delta m \approx -\left(\frac{\partial m_0}{\partial m}\right)^{-1}(m_1(m)\Delta\theta_1^m + m_2(m)\Delta\theta_2^m) \\ \Delta y \approx -\left(\frac{\partial y_0}{\partial y}\right)^{-1}(y_1(y)\Delta\theta_1^y + y_2(y)\Delta\theta_2^y) \\ \Delta k \approx -\left(\frac{\partial k_0}{\partial k}\right)^{-1}(k_1(k)\Delta\theta_1^k + k_2(k)\Delta\theta_2^k) \end{cases} \quad (9)$$

The color tone correction amount determination unit 319 transmits the tone correction value $\Delta c$=($\Delta c$, $\Delta m$, $\Delta y$, $\Delta k$) expressed by equation (9) to the tone correction unit 316.

The tone correction unit 316 adds the tone correction value $\Delta c$ to the reference tone correction table values ($c_0$, $m_0$, $y_0$, $k_0$) (step S205).

The processes of steps S201 to S205 are repeated until the printing is completed (YES at step S206). Thereby, the reproduced colors are maintained constant even with the measurement sensor 45, the channels of which are fewer than the basic colors.

To derive the tone correction value $\Delta c$ at high speed, it is desirable to previously calculate and quantify the coefficients on the right side of equation (9) other than the mode parameters $\Delta\theta_1$ and $\Delta\theta_2$ and store the quantified coefficients in the memory 302 as a correction gain table G.

The correction gain table G represents adjustment amounts in an input tone space of tone characteristics such as lightness and density, and thus is independent of the output tone space, i.e., the color space to be represented.

Therefore, the correction gain table G may be previously calculated based on a given measurement amount to accurately determine the tone characteristics of the input basic colors.

In the present example, in which the four basic colors CMYK are projected into the n-dimensional color space, even if the value n in one sample is smaller than the measurement channel number, equation (7) holds and equation (8) is solved if a sufficient amount of independent data is obtained.

$$E[{}^t M_i{}^t JJ M_j] \tag{10}$$

That is, in equation (10) representing the elements of the correction array F, the rank of the matrix inside the expected value E in each sample is smaller than the measurement channel number, i.e., the number of measurement channels used in the measurement by the measurement sensor 45, and thus the matrix in equation (10) fails to be regular. Through averaging over a plurality of samples, however, the matrix in equation (10) becomes regular.

Specifically, equation (7) is satisfied by accumulating and averaging samples sufficiently sensitive to the change in the color difference evaluation function f, i.e., highly sensitive to the change in the basic colors CMYK.

The color difference evaluation function f may be set as $f(Lab_t, Lab_m) = (L_m - L_t, a_m - a_t, b_m - b_t)$, for example. Alternatively, the color difference evaluation function f may be set as $f(Lab_t, Lab_m) = L_m - L_t$, which simply focuses on the lightness difference alone. In this case, however, the color difference evaluation function f may fail to provide sufficient resolution of the lightness difference of yellow (Y). In this case, therefore, the color difference evaluation function f may be set as $f(Lab_t, Lab_m) = (L_m - L_t, b_m - b)$ or $f(Lab_t, Lab_m) = \|Lab_t - Lab_m\|$.

In the present embodiment, the color tone correction amount determination unit 319 synthesizes the correction array F based on the colorimetric values mesLab including the measurement values in mixed-color areas measured by the measurement sensor 45, the image data R, and the first variation mode $c_1$, $m_1$, $y_1$, and $k_1$ and the second variation mode $c_2$, $m_2$, $y_2$, and $k_2$ serving as the basis for approximating the change in the tone characteristics.

Herein, the correction array F is a regular matrix formed based on the first variation mode $c_1$, $m_1$, $y_1$, and $k_1$ and the second variation mode $c_2$, $m_2$, $y_2$, and $k_2$.

With the above-described configuration, the reproduced colors are maintained constant even with the measurement sensor 45 having channels fewer than the number of basic colors.

As described above, the output of the color difference evaluation function f ($Lab_t$, $Lab_m$) is necessarily to derive the mode parameters $\Delta\theta_1$ and $\Delta\theta_2$. Intermediate inputs, however, are not necessarily required to be represented in the Lab format. Therefore, the input signals to the color tone correction amount determination unit 319 may be represented as RGB values or CMYK values other than the Lab values.

Further, in the present embodiment, the number of basic colors output by the image forming unit 4 is four (i.e., CMYK), while the number of measurement channels of the measurement sensor 45 of three. With this configuration, i.e., with the measurement sensor 45 having channels fewer than the number of basic colors, the reproduced colors are maintained constant with a reduction in cost of the measurement sensor 45.

Further, the input signals may include the color information of a color formed by a combination of the basic colors, or may be monochrome signals corresponding to one of the basic colors and not including the color information, for example. If such monochrome signals are used, it is desirable that the monochrome sensors are preceded by filters each having a predetermined spectral characteristic to be sensitive to basic colors corresponding to the respective predetermined spectral characteristics.

Figure 6A:
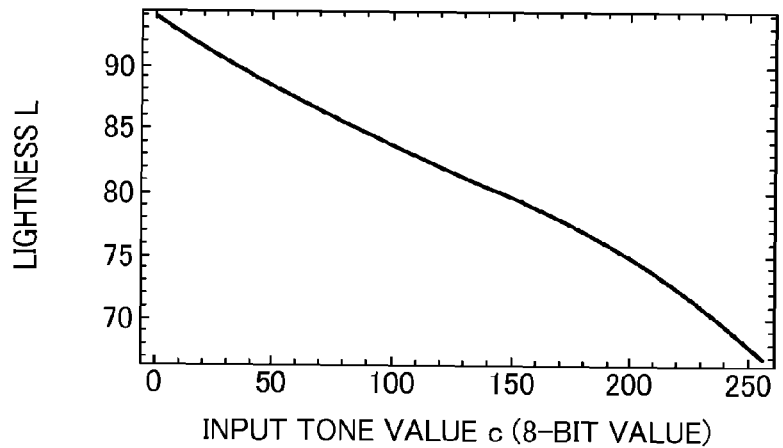
FIGS. 6A to 6C are diagrams illustrating a combination example of a tone characteristic, a variation mode, and a variation correction gain used by the image forming system illustrated in FIG. 3.
Figure 6B:
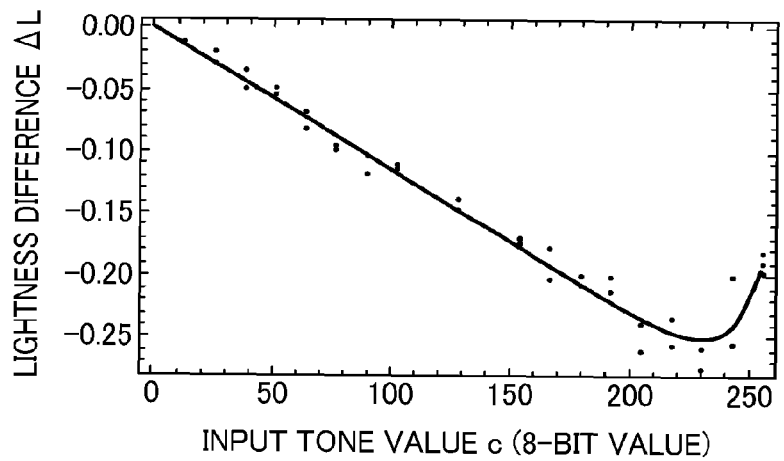
Figure 6C:
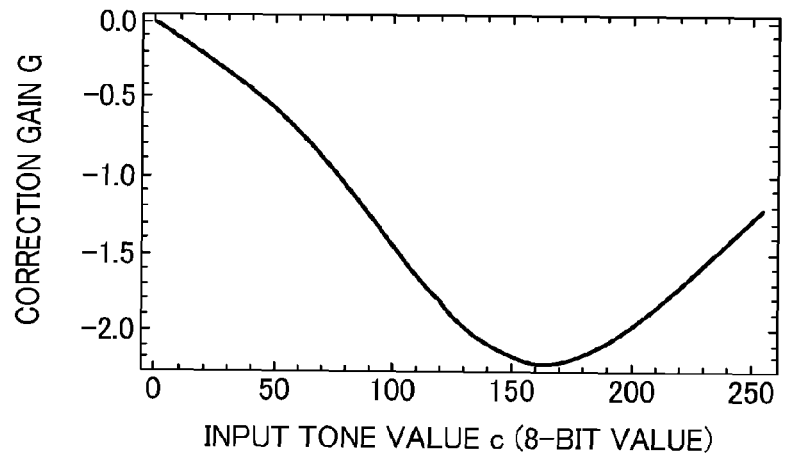

FIGS. 6A, 6B, and 6C illustrate a tone characteristic (i.e., lightness L), the first variation mode $c_1$ (i.e., lightness difference $\Delta L$), and a variation correction gain (i.e., correction gain table G), respectively, for the tone value of cyan (C) as an example of the tone values of CMYK.

The following description of the tone value of cyan (C) also applies to the other basic colors MYK, and thus description thereof will be omitted.

The input range of the CMYK tone values is 8 bits, i.e., discrete integer values from 0 to 255.

The tone characteristic illustrated in FIG. 6A varies somewhat as the printing proceeds. The points plotted in FIG. 6B represent an example of a first main component of this variation in the tone characteristic for cyan (C) obtained from samples experimentally collected from colorimetric areas.

As illustrated in FIG. 6B, the points of the first main component collected from the samples are not smooth owing to noise superimposed thereon by various disturbances.

The direct use of the first main component to derive the mode parameters $\Delta\theta_1$ and $\Delta\theta_2$ and the tone correction value $\Delta c$, however, may result in non-smooth calculation results of the tone correction value $\Delta c$ and error amplification due to overfitting.

In the present embodiment, therefore, the first variation mode $c_1$ serves as a smooth function for roughly approximating the first main component, as indicated by a solid line in FIG. 6B.

The first variation mode $c_1 = (c_1, m_1, y_1, k_1)$ is a function that approximates the main component, which approximates the variation in the tone characteristic more efficiently than the other components of the variation in the tone characteristic. The first variation mode $c_1$ is therefore capable of accurately determining the tone correction value $\Delta c$ even if the number of samples in the colorimetric areas is small.

In the present embodiment, each variation mode $c_i = (c_i, m_i, y_i, k_i)$ is implemented as an array including 256 elements for each of the colors. If the variation mode $c_i$ is implemented as an array including fewer elements and a piecewise smooth function using the values of the array, memory usage is reduced. For example, the piecewise smooth function may be implemented by the interpolation of that array. Further, the variation mode $c_i$ is not necessarily required to strictly match the main component, and it suffices if a certain number of components of the variation in the tone characteristic are approximated in the variation mode c, as a whole. Therefore, the variation mode $c_i$ may be implemented by a function model that roughly approximates the main component.

With the above-described configuration, overfitting to disturbances such as measurement noise and density variation is suppressed, and the memory usage and the calculation amount are reduced, consequently reducing the calculation load and thus the load on the control board such as an ASIC or the control processor such as a CPU, for example.

The present embodiment has at least two change mode data items linearly independent of each other, i.e., the first variation mode $c_1 = (c_1(c), m_1(m), y_1(y), k_1(k))$ and the second variation mode $c_2=(c_2(c), m_2(m), y_2(y), k_2(k))$. With this configuration, variations including higher-order variations are accurately corrected.

The measurement sensor 45 may be a monochrome line sensor having a predetermined spectral characteristic, as described above. With this configuration, colorimetric errors of the measurement sensor 45 in measuring the chromaticity are reduced. Therefore, the increase in the number of samples necessary for deriving the tone correction value Δc is suppressed, while the cost and colorimetric errors of the measurement sensor 45 are reduced. Further, restrictions on the design of the output image in terms of the colorimetric position, the selection condition, and so forth are reduced.

The color tone correction amount determination unit 319 may determine the tone correction value Δc for correcting the tone correction table based on the colorimetric values mesLab measured by the image inspection unit 33, the predicted output values prnLab, and the tone values prnCMYK.

Further, although the image forming unit 4 of the image forming apparatus 100 employs an electrophotographic system using the basis colors CMYK, the image forming unit 4 may employ an inkjet system, and may use an increased number of basic colors.

Further, although the measurement sensor 45 of the present embodiment is disposed downstream of the secondary transfer position N2 in the transport direction of the sheet P to measure the reflection characteristics of all or a part of the toner image formed on the sheet P, the measurement sensor 45 may be configured to measure the reflection characteristics of all or a part of the toner image formed on the transfer belt 47.

An image forming system according to an embodiment of this disclosure is capable of maintaining reproduced colors constant with a measurement sensor having channels fewer than the number of basic colors. Effects of this disclosure, however, are not limited to this preferable effect.

Numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. Further, the above-described steps are not limited to the order disclosed herein. It is therefore to be understood that, within the scope of the appended claims, this disclosure may be practiced otherwise than as specifically described herein.

What is claimed is:

1. An image forming system comprising:
   an image output device to output an image on a recording medium with a mixture of a plurality of basic colors based on an image data array combining the basic colors;
   a measurement sensor to measure a reflection characteristic of at least a part of the image output by the image output device;
   tone correction value generation processing circuitry to generate, for each of the basic colors, a tone correction value for correcting a tone characteristic of the basic color by synthesizing a correction array forming a regular matrix based on the reflection characteristic measured by the measurement sensor and the image data array; and
   tone correction processing circuitry to correct an image output by the image output device with the tone correction value,
   wherein the tone correction value generation processing circuitry synthesizes the correction array based on change mode data serving as a basis for approximating a change in the tone characteristic of each of the basic colors.

2. The image forming system of claim 1, wherein the basic colors of the image output by the image output device include at least four basic colors, and
   wherein the measurement sensor includes a predetermine number of measurement channels.

3. The image forming system of claim 1, wherein the change mode data is a function that approximates a main component of the change in the tone characteristic of each of the basic colors.

4. The image forming system of claim 3, wherein the function is one of:
   an array having a predetermined number of elements; and
   a combination of an array having fewer elements than the predetermined number of elements and a piecewise smooth function implemented by interpolation of the array having fewer elements.

5. The image forming system of claim 1, wherein the change mode data includes at least two change mode data items linearly independent of each other for each of the basic colors.

6. The image forming system of claim 1, wherein the tone correction value generation processing circuitry generates the tone correction value by holding a mode parameter that determines a degree of contribution of the change mode data and updating the mode parameter based on the correction array.

7. The image forming system of claim 1, wherein the measurement sensor is a monochrome line sensor having a predetermined spectral characteristic.

8. The image forming system of claim 1, wherein the correction array is based on two variation mode matrices.

9. The image forming system of claim 1, wherein the correction array is based on exactly two variation mode matrices.

10. An image forming method comprising:
    outputting an image on a recording medium with a mixture of a plurality of basic colors based on an image data array combining the basic colors;
    measuring a reflection characteristic of at least a part of the output image;
    generating, for each of the basic colors, a tone correction value for correcting a tone characteristic of the basic color by synthesizing a correction array forming a regular matrix based on the measured reflection characteristic and the image data array; and
    correcting an image to be output with the tone correction value,
    wherein the generating synthesizes the correction array based on change mode data serving as a basis for approximating a change in the tone characteristic of each of the basic colors.

11. The image forming method of claim 10, wherein the outputting uses at least four basic colors as the basic colors of the image; and
    wherein measuring uses a predetermine number of measurement channels.

12. The image forming method of claim 10, wherein the generating uses, as the change mode data, a function that approximates a main component of the change in the tone characteristic of each of the basic colors.

13. The image forming method of claim 12, wherein the generating uses, as the function, one of an array having a predetermined number of elements and a combination of an array having fewer elements than the predetermined number of elements and a piecewise smooth function implemented by interpolation of the array having fewer elements.

14. The image forming method of claim 10, wherein the generating uses, as the change mode data, at least two change mode data items linearly independent of each other for each of the basic colors.

15. The image forming method of claim 10, wherein the generating holds a mode parameter that determines a degree of contribution of the change mode data and updates the mode parameter based on the correction array.

16. The image forming system of claim 1, wherein the change mode data includes exactly two change mode data items linearly independent of each other for each of the basic colors.

17. The image forming method of claim 10, wherein:
   the generating synthesizes the correction array which is based on two variation mode matrices.

18. The image forming method of claim 10, wherein:
   the generating synthesizes the correction array which is based on exactly two variation mode matrices.

19. The image forming method of claim 10, wherein the generating uses, as the change mode data, exactly two change mode data items linearly independent of each other for each of the basic colors.

\* \* \* \* \*